Jan. 3, 1939.  J. J. WALLACE  2,142,977
EXPANDING ROLL BOX FOR COTTON GINS
Filed July 12, 1937  4 Sheets-Sheet 2

Inventor
J. J. Wallace
By Mason Fenwick & Lawrence
Attorneys

Jan. 3, 1939.  J. J. WALLACE  2,142,977
EXPANDING ROLL BOX FOR COTTON GINS
Filed July 12, 1937  4 Sheets-Sheet 3

Inventor
J. J. Wallace
By Mason Fenwick & Lawrence
Attorneys

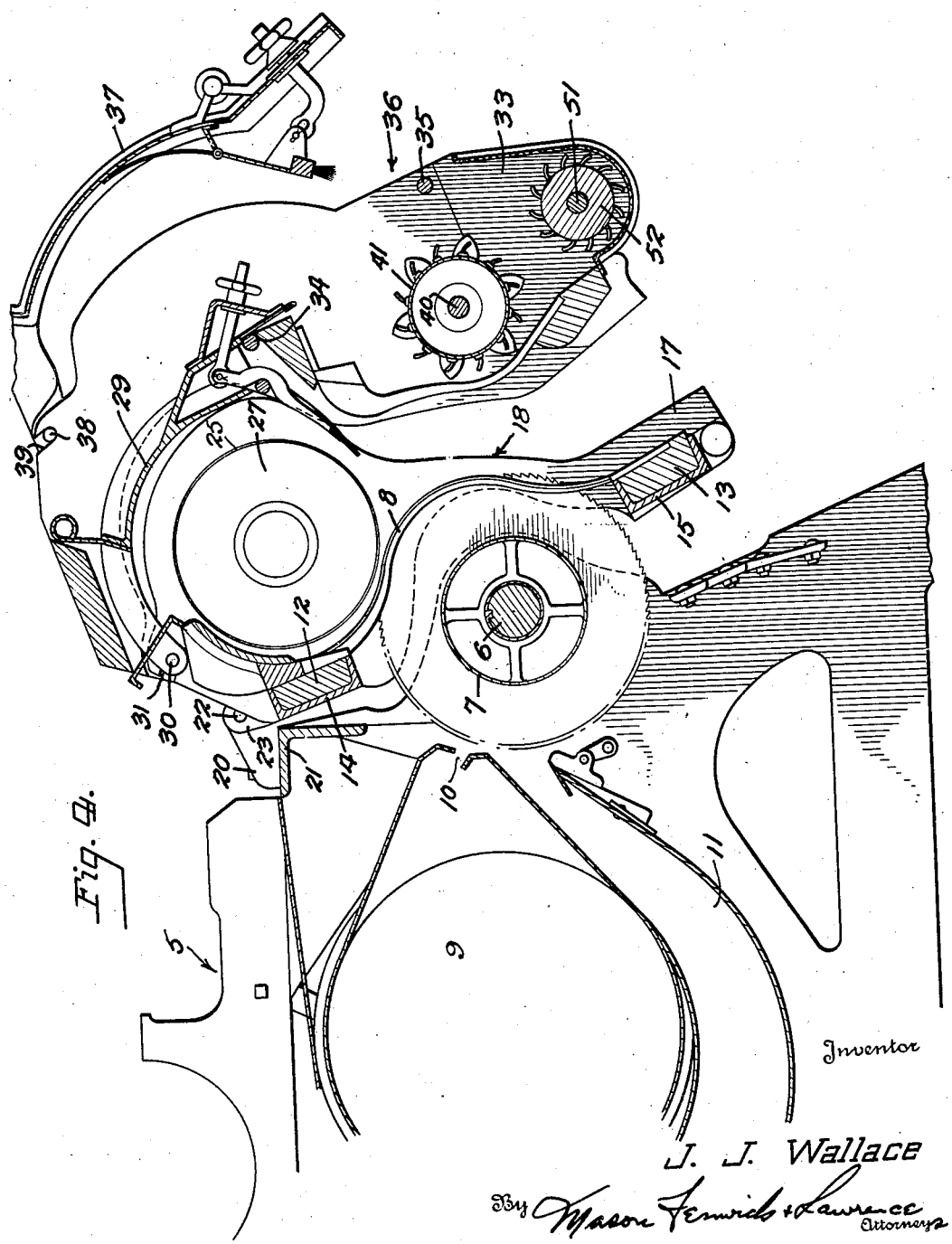

Patented Jan. 3, 1939

2,142,977

UNITED STATES PATENT OFFICE 2,142,977

EXPANDING ROLL BOX FOR COTTON GINS

Jeffrey John Wallace, Amite, La., assignor to Gullett Gin Company, Amite, La., a corporation of Louisiana Application July 12, 1937, Serial No. 153,241

1 Claim. (Cl. 19—55)

This invention relates generally to improvements in the roll boxes of cotton gins.

The main object of the invention is to provide a cotton gin with a box formed of pivotally connected units adapted to be swung apart to facilitate the dumping of seed and debris from the box.

Another object of the invention is to provide a roll box with end walls rotatable freely with the cotton roll to eliminate friction as much as possible in the roll box, and permit the roll to be turned more freely by the saws.

A further object of the invention is to provide a unitary support for a roll box and huller in a cotton gin in which the huller roller is adjustable in an arcuate path toward and from the ribs of the cotton gin.

Other objects will become apparent as the detailed description thereof proceeds.

In the drawings:

Figure 4 is a section similar to Figure 3, with the parts shown in the positions shown in Figure 2.

Figure 1:
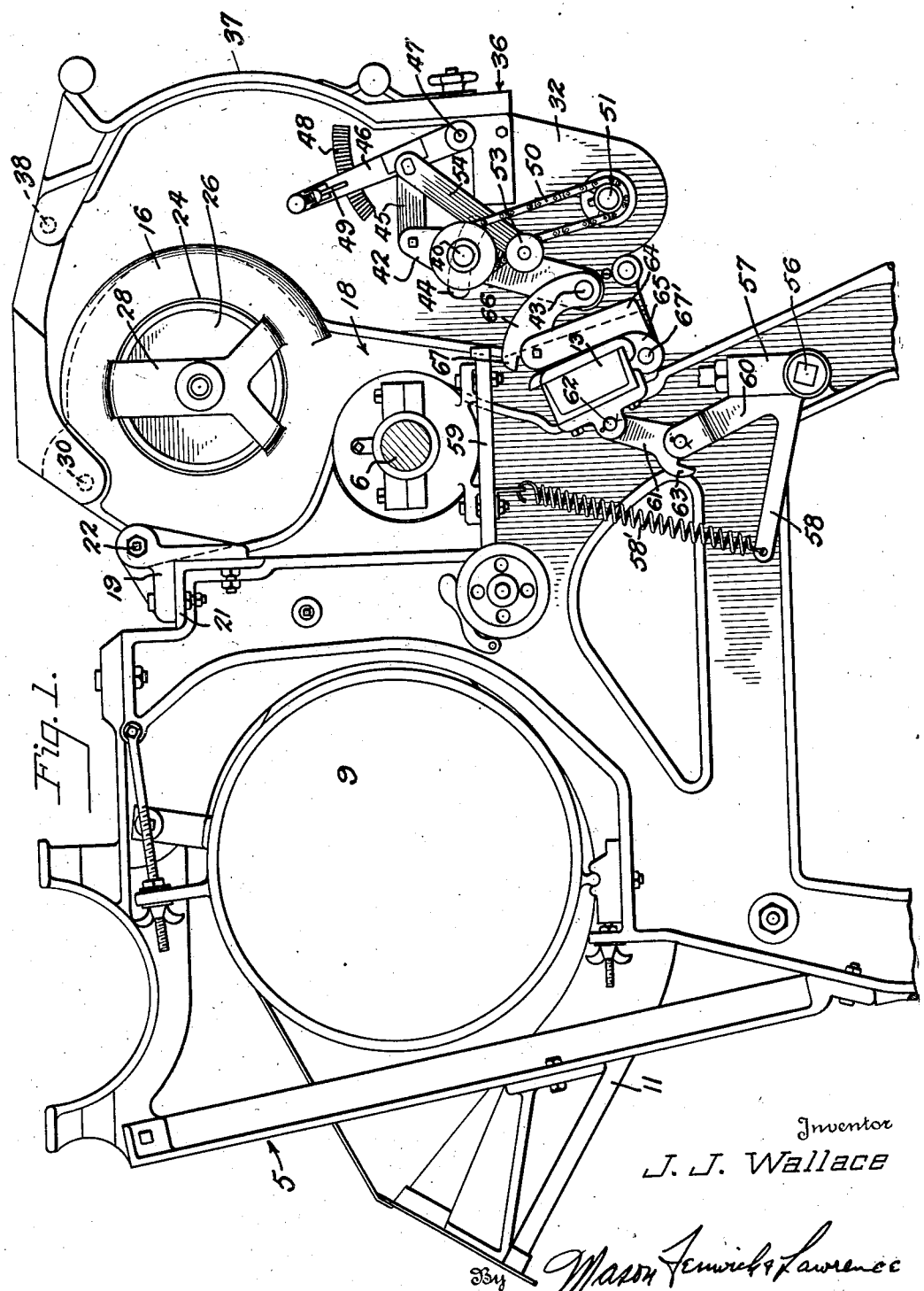
Figure 1 is an end elevation of a cotton gin constructed in accordance with the present invention.

As shown in the drawings, the invention comprises the gin framework, designated generally by the reference numeral 5, on which is journaled the shaft 6 of a cylinder 7, the saws of which project as usual through the ginning ribs 8, when the machine is in operation. Air under pressure from the reservoir 9 operates through the nozzle 10, adjacent the periphery of the saw cylinder, to force the lint from the saw teeth, into a flue 11, connected with a condenser (not shown). There is nothing novel in this part of the apparatus. Therefore, no attempt is made to illustrate it in any great detail. It will be understood, however, that the various standards of the framework will be duplicated at opposite sides of the machine, to support the various shafts and cross supports.

The ginning ribs 8 are secured at their opposite ends as usual to top and bottom wooden runners 12 and 13, suitably secured in the channels 14 and 15, respectively, which extend between and are suitably secured to the castings 16 and 17, forming parts of the end walls of the roll chamber. The roll box unit, designated gen- erally by the reference numeral 18, is pivoted to the framework 5, by means of the brackets 19 and 20, suitably secured to the cross bar 21 by means of the pivot rod 22 passing through registering apertures in ears 23, extending from the channel iron 14 adjacent the said brackets 19 and 20.

The castings 16 and 17 are provided in their pivoted ends with circular apertures 24 and 25, respectively, to receive the plates 26 and 27, which form the ends of the roll chamber. These plates 26 and 27 are mounted to rotate in roller bearings on spiders 28, formed integral with, or suitably secured to the castings 16 and 17. A floating roll board 29 extends between the castings 16 and 17, and is pivoted at its rear edge by means of a pivot 30, seating in slots 31 formed in the castings 16 and 17. The pivot axis of the floating roll board 29 is displaced rearwardly with respect to a vertical plane passing through the axis of rotation of the plates 26 and 27. The roll board 29, therefore, forms a pivoted cover for the roll chamber, and obviously must be supported at its free end to prevent its falling by gravity into the roll chamber.

The roll box unit 18 may be considered as the inner half of the cotton box. The other half of this cotton box comprises the end castings 32 and 33, shaped at their inner edges to fit the outer edges of the castings 16 and 17, respectively. Tie rods 34 and 35 secure the castings 32 and 33 in properly spaced apart relation to form a huller box 36 pivoted at its upper end to swing about the same axis as the pivots 30 in the slots 31. The upper tie rod 34 forms a support for the free edge of the roll board 29.

A front cover 37 of the huller is pivoted at the opposite ends of its upper edge by means of the pivot studs 38 extending inwardly from the castings 32 and 33 to seat in the slots 39 formed in the top edges of the castings 32 and 33. A shaft 40, for the huller roller 41, is journalled at its opposite ends in links 42 (see Figures 1 and 2) which are pivoted at their lower ends by means of pivot bolts 43 to the lower ends of the castings 32 and 33. Arcuate slots 44 are provided in the castings 32 and 33 to permit adjustment of the shaft 41 about its pivot 43. To effect this adjustment, the upper end of each link 42 is pivoted to one end of a link 45, the other end of which is pivoted to the lever 46.

The lower end of lever 46 is pivoted to the casting supporting it by means of the pivot 47; and the free end of this lever is adjustable over an arcuate toothed scale 48, the teeth of which are adapted to be engaged by a spring click 49, suitably mounted on the free end of the lever. A drive chain 50 for transmitting rotation from shaft 41 to the shaft 51 of conveyor 52, is maintained taut by means of the idler 53 pivoted on the free end of a link 54, which is pivoted at its other end to the lever 46.

Figure 2:
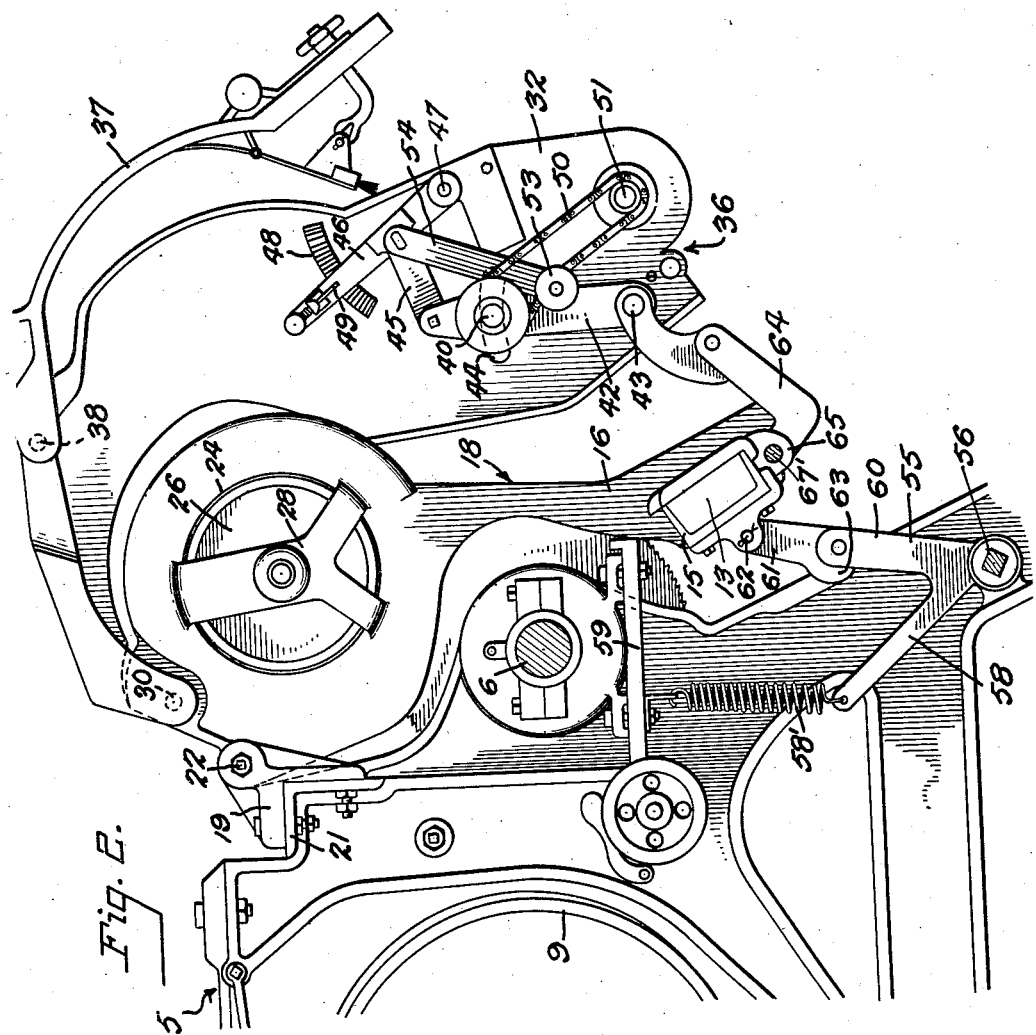
Figure 2 is a view similar to Figure 1, with the parts shown in different position.
Figure 3:
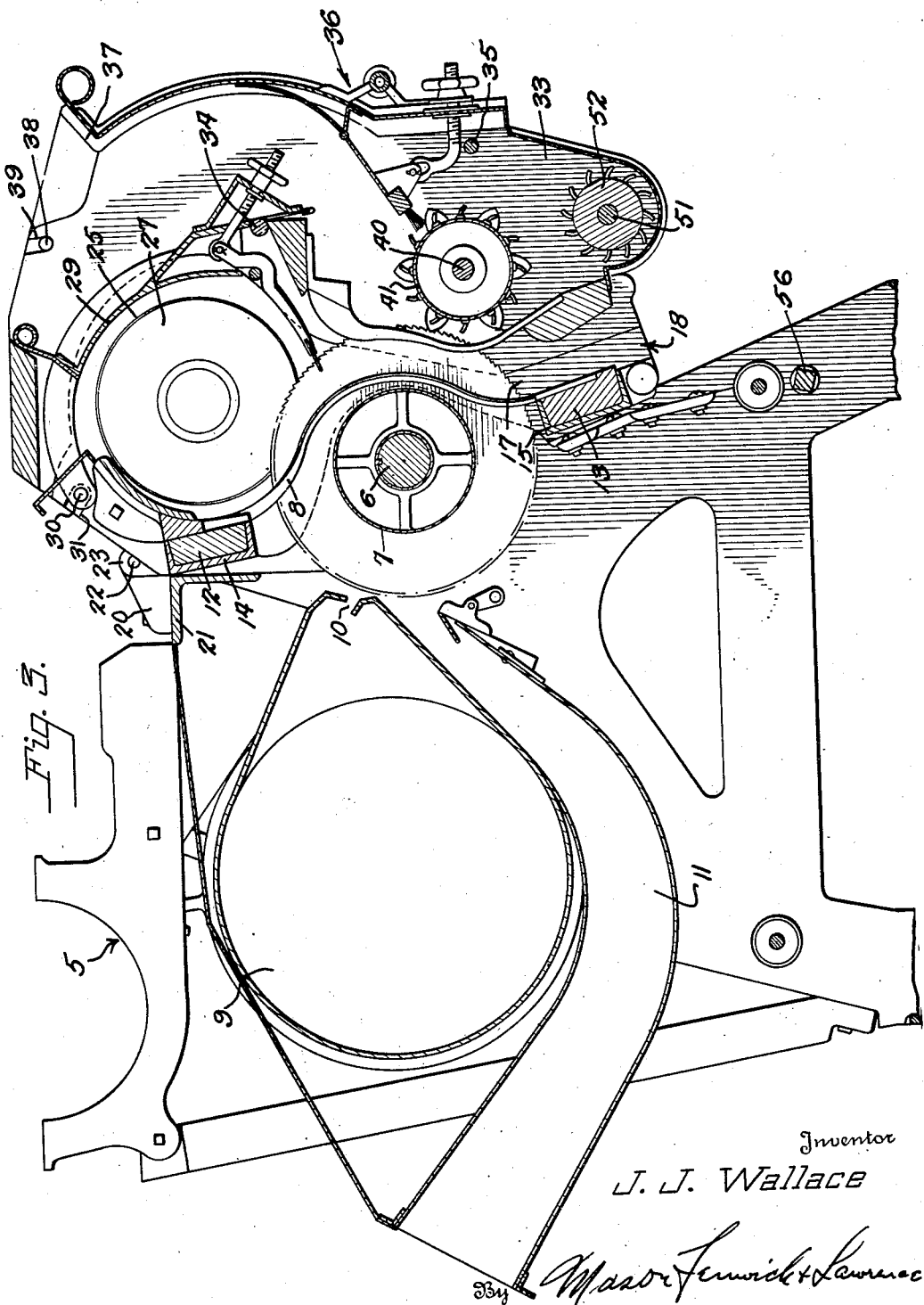
Figure 3 is a central longitudinal section through the cotton gin, with the parts in positions shown in Figure 1.

The cotton box, comprising the roll box and huller units 18-36, may be rotated as a whole about the pivot 22, to swing the ginning ribs 8 clear of the saws, by means of the toggle linkage shown in Figures 1 and 2. This linkage comprises a bell crank 55 fixed on a square section shaft 56, adapted to be manually rotated by a lever 57.

One arm 58 of the bell crank 55 is connected by a tension spring 58' to a flange 59 on the framework 5 to counterbalance most of the weight of the cotton box. The other arm 60 of the bell crank is pivoted to one end of a link 61 having its other end pivoted to a lug 62 on the back of the channel 15. A projection 63 on the link 61, cooperates with the adjacent edge of arm 60 to hold the arm 60 and link 61 in position—past dead center—to lock the entire cotton box out of operative relation with the saw cylinder, as shown in Figures 2 and 4.

The huller unit 36 may be separated from the roll box unit 18, by means of a manually operable toggle linkage, comprising the L-shaped lever 64, pivoted at one end to a lug 65 projecting from the channel 15. At its other end the lever 64 is pivotally connected to one end of a link 66 which, in turn, is pivoted to the pivot bolt 43.

The lug 67 on the end of link 66 cooperates with the adjacent edge of arm 64 to lock the huller unit releasably in the position shown in Figures 2 and 4; that is, with the huller unit separated from the roll box unit to dump debris from the roll box. To operate this toggle the pivot stud 67' is fixed to the lever 64, and a handle (not shown) may be suitably secured to the stud 67' to rotate the same and operate the linkage connected thereto.

What I claim is:

In a cotton gin, a support, a saw cylinder journaled in said support, a cotton box connected to the upper end of said support to swing about an axis parallel to and laterally displaced with respect to the axis of said saw cylinder, said cotton box comprising two sections, one section forming a roll box carrying ginning ribs, the other section forming a huller box carrying a huller roll and huller ribs cooperating therewith, said huller box being connected to said roll box to swing about an axis spaced from and parallel to the first named axis, mechanism connected to said support and the lower end of the roll box to swing the cotton box as a whole out of operating connection with the saw cylinder, mechanism connecting the lower ends of the roll box and huller box to swing the two boxes apart for dumping debris from the roll box, said roll box including a roll board pivoted to swing about the pivot axis of the huller box, and means carried by the huller box to form a support for the free end of the roll board said roll board floating about its pivot axis above said means to form an expanded roll box and move with the huller box to release cotton and seed from the roll box when the two boxes are separated.

JEFFREY JOHN WALLACE.